Figure 1:
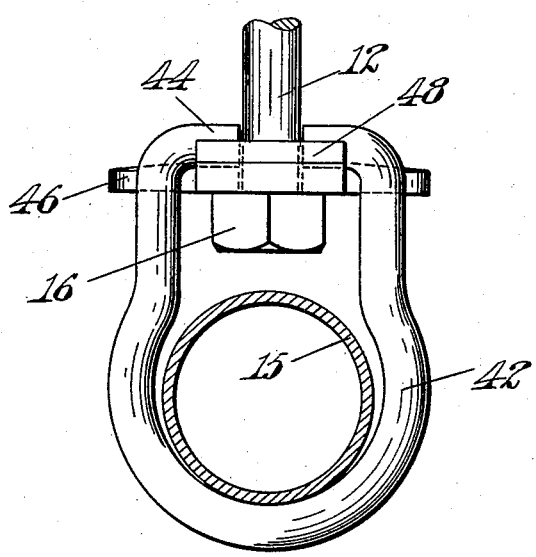

P. N. KENWAY.
PIPE HANGER.
APPLICATION FILED MAR. 10, 1909. RENEWED JULY 21, 1911.

1,017,975.

Patented Feb. 20, 1912.

WITNESSES
Norman C Hussey
H. E. Tucker

INVENTOR
Percy N. Kenway
by his atty
H. W. Kenway

UNITED STATES PATENT OFFICE.

PERCY N. KENWAY, OF NEWTON, MASSACHUSETTS, ASSIGNOR TO CHARLES E. RILEY, OF NEWTON, MASSACHUSETTS.

PIPE-HANGER.

1,017,975. Specification of Letters Patent. Patented Feb. 20, 1912.

Application filed March 10, 1909, Serial No. 482,479. Renewed July 21, 1911. Serial No. 639,867.

*To all whom it may concern:*

Be it known that I, PERCY N. KENWAY, a citizen of the United States, residing at Newton, in the county of Middlesex and State of Massachusetts, have invented certain new and useful Improvements in Pipe-Hangers, of which the following is a specification.

This invention relates to devices for hanging pipes, indirect radiators, refrigeration apparatus and the like, and contemplates the provision of means whereby the ordinary lag screw or machine bolt may be conveniently employed, to the exclusion of the lag screw hook or machine bolt hook now commonly used in certain classes of work.

Heretofore, in the class of work to which the present invention relates, it has been customary to make use of a hook having a long straight shank and a lag screw end, such a hook being termed a "lag screw hook," or in case the piping is to be suspended from an I-beam or the like, to use a beam clamp and a hook having a machine thread and nuts for engaging the beam clamp, such a hook being termed a "machine bolt hook." In practice hooks are located at suitable distances apart and the piping hung therefrom by pipe rings which encircle the pipe and are suspended from the hooks.

Lag screw hooks or machine bolt hooks require hand forging, while lag screws and machine bolts are entirely machine made and consequently much cheaper than the former. With these conditions in view, it is an object of the present invention to provide a device for suspending pipe, which may be used in combination with a lag screw or machine bolt having the ordinary machined head, whereby the expense of the hand forged hooks is avoided and the workman enabled to substitute a lag screw or machine bolt, both of which articles are kept in stock in all required lengths.

A preferred embodiment of my invention comprises a pipe encircling or ring member having oppositely disposed, inwardly extending ends and a yoke member for engaging the head of a lag screw or machine bolt and supporting said ring member by said inwardly extending ends.

The ring member may be constructed preferably of a heavy steel wire or rod of ductile material having sufficient tensile strength to withstand the stress to be imposed upon it. A ring member of this type constitutes an important feature of the present invention since it lends itself particularly well to the requirements of the art, being easily and cheaply constructed and at the same time possessing a maximum of strength.

The yoke member may be a malleable casting, or preferably of drop forged or stamped steel, and comprises a plate apertured to receive the shank of a lag screw or machine bolt, and shaped to receive the ends of the ring member and prevent them from spreading laterally. Such a yoke is particularly advantageous since it constitutes a swivel connection with the lag screw or bolt, whereby adjustment of the latter may be effected without the necessity of disarranging or unhanging the pipe. This is an important advantage of the present invention over the lag screw hook arrangement in general use at present, since in alining a run of piping hung from lag screw hooks it is necessary to lift each pipe ring off the hook before the latter can be turned for vertical adjustment.

Another important feature of the invention, incident to the construction of the yoke, is that the weight of the piping is transmitted to the yoke, by the pipe encircling member, as a direct compression, there being no tension or bending stress imposed on the yoke at any time. Further than this, the yoke may be of such size and shape that those portions thereof which receive the compression transmitted by the pipe encircling member are supported directly by the head of the lag screw or machine bolt.

The construction and arrangement above discussed is particularly advantageous since it permits the employment of a relatively light yoke with practically no danger of breakage.

Figure 3:
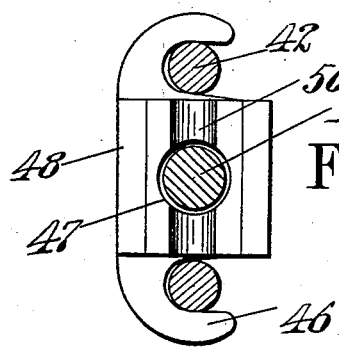
Figure 2:
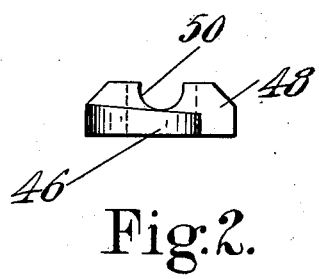

The features above set forth and others incident to the present invention will be best understood and appreciated from the following description of a preferred embodiment thereof selected for purposes of illustration, together with the accompanying drawings in which, Figure 1 is an elevation of a preferred embodiment of my invention showing the pipe in section. Figs. 2 and 3 are side view and plan respectively, of the yoke shown in Fig. 1.

In this embodiment, the yoke 48 may be constructed of malleable casting or of steel and comprises a thick plate having a groove 50 formed in its upper surface and a centrally located aperture 47 for the reception of the lag screw or machine bolt shank 12. Forwardly extending lips or inclosing portions 46 are provided at each side of the yoke for engaging the outer sides of the ends of the ring member 42 and to prevent spreading thereof. The ring member is constructed of a continuous piece of steel rod, heavy steel wire or other ductile material which may be bent cold to the shape required. The oppositely disposed inturned ends 44 constitute trunnions, whereby the ring member is suspended from the yoke 48. It will be apparent that in the construction under discussion the lips 46 will prevent the ends 44 of the ring member from being disengaged from the yoke by movement toward the rear and consequently the rear wall of the groove 50 is not required to prevent such disengagement. The forward wall of the groove, however, constitutes, in effect a shoulder for preventing disengagement of the ring member by movement toward the front.

The weight of the piping is transmitted from the inwardly extending ends 44 of the pipe encircling member to the yoke 48 as a direct compression, while the head 16 of the lag screw extends under the stressed portion of the yoke and receives the pressure from the yoke without subjecting the latter to any bending stress. Such a condition is, for obvious mechanical reasons, most desirable.

It will be observed that the inwardly extending ends of the pipe encircling member are of uniform cross section with the body portion of this member, there being no necessity for shaping the ends to prevent their spreading since this function is accomplished by inclosing portions of the yoke. By this arrangement the construction of the pipe encircling member is simplified so that it may be bent up easily with ordinary bending dies, while the expense of constructing the yoke is not appreciably affected by forming them so as to inclose the ends of the pipe encircling member and prevent spreading thereof.

In practice the lag screw, with the yoke surrounding its shank, is secured to a beam or ceiling and the ends 44 of the ring member, which has previously been slipped on the pipe, are placed in the groove 50 and extend downwardly inside the lips 46.

In the claims forming a part of this specification the term "lag screw" is used for the sake of brevity in several places instead of the expression "lag screw or machine bolt." It should be understood, however, that these are considered as equivalent devices, it being immaterial, so far as relates to the present invention, which device is employed to support the hanger.

Having explained the nature of my invention and illustrated a preferred embodiment, I desire to secure by Letters Patent of the United States:—

1. A hanger for use with a lag screw or the like, comprising a yoke constructed and arranged to be supported by a lag screw, said yoke having inclosing portions and a groove in its upper surface, together with a member for encircling a pipe, said member being constructed of a continuous integral piece of heavy wire and having oppositely disposed ends of the same cross section as the body portion thereof adapted to engage in said groove and being prevented from spreading by the inclosing portions of said yoke.

2. A hanger for use with a lag screw or the like, comprising a yoke constructed and arranged to be supported by the head of a lag screw and swivel about the shank thereof, together with a member for encircling a pipe, said member being constructed of a continuous integral piece of heavy wire and having unjoined ends of uniform cross section extending in alinement with each other and arranged to engage said yoke, above the head of the lag screw, said yoke being so shaped as to prevent spreading of the ends of said member.

3. A hanger for use with a lag screw or the like, comprising a yoke constructed and arranged to be supported by the head of a lag screw and swivel about the shank thereof and having angularly extending lips, together with a member for encircling a pipe, said member being constructed of a continuous integral piece of ductile material, the ends thereof being shaped to engage said yoke and prevented from spreading by said angularly extending lips.

4. A hanger for use with a lag screw or the like, comprising a yoke constructed and arranged to be supported by the head of a lag screw and swivel about the shank thereof and having lips extending outwardly and forwardly from each side thereof, together with a member for encircling a pipe, said member being constructed of a continuous piece of ductile material and having upwardly extending portions located within said lips and laterally extending ends for engaging said yoke.

5. A hanger for use with a lag screw or the like, comprising a yoke constructed and arranged to be supported by the head of a lag screw and swivel about the shank thereof, together with a pipe encircling member constructed of ductile material of uniform cross section and having upwardly extending portions and horizontally extending ends, said yoke being provided with lips for preventing disengagement of said pipe encircling member by a movement toward the rear and a shoulder for preventing such disengagement by a forward movement of said member.

6. A hanger for use with a lag screw or the like, comprising, a yoke constructed and arranged to be supported by the head of a lag screw and swivel about the shank thereof, together with a pipe encircling member constructed of a continuous piece of ductile material of uniform cross section and having upwardly extending portions and ends extending in alinement with each other and parallel with the surface of said yoke, said yoke being provided with means for preventing accidental disengagement of said pipe encircling member and also with ears for preventing lateral displacement.

7. A hanger for use with a lag screw or the like, comprising an apertured yoke having inclosing portions and alined grooves in its upper surface, together with a pipe encircling member formed of an integral piece of heavy wire and having oppositely disposed inturned ends of the same cross section as the body portion thereof, said ends being adapted to engage in said grooves of the yoke and being prevented from spreading by the inclosing portions of the yoke.

In testimony whereof I affix my signature in presence of two witnesses.

PERCY N. KENWAY.

Witnesses:
H. W. KENWAY,
ARTHUR L. RUSSELL.

---

Copies of this patent may be obtained for five cents each, by addressing the "Commissioner of Patents, Washington, D. C."